(No Model.)
F. F. WOLGAMUTH.
HARROW AND CULTIVATOR TOOTH.
No. 349,967. Patented Sept. 28, 1886.
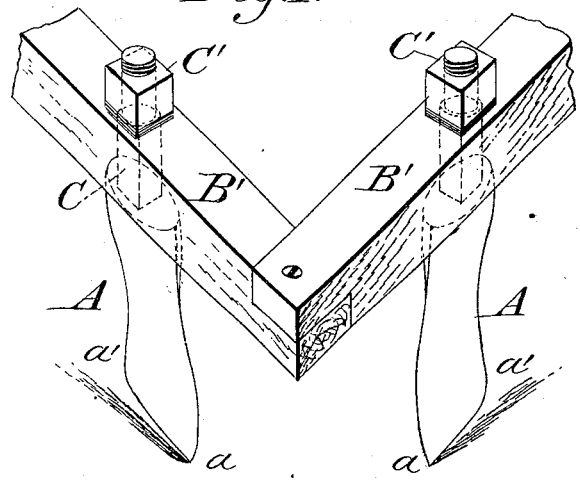
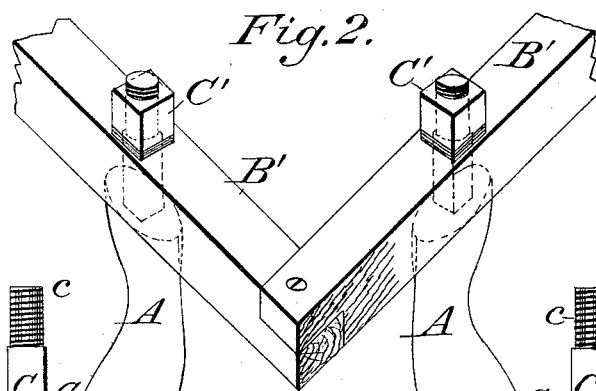
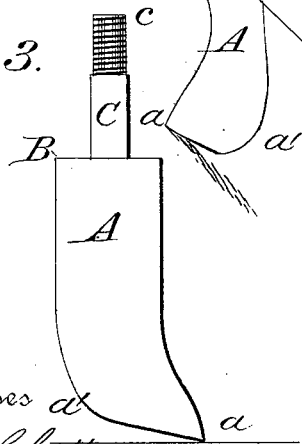
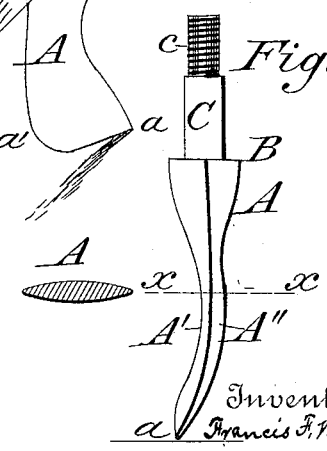
Witnesses
F. H. Schott
W. Burris
Inventor
Francis F. Wolgamuth
By his Attorney Wm. H. Ruff

UNITED STATES PATENT OFFICE.

FRANCIS F. WOLGAMUTH, OF SOUTHAMPTON, PENNSYLVANIA.

HARROW OR CULTIVATOR TOOTH.

SPECIFICATION forming part of Letters Patent No. 349,967, dated September 28, 1886.

Application filed August 12, 1886. Serial No. 210,686. (No model.)

*To all whom it may concern:*

Be it known that I, FRANCIS F. WOLGAMUTH, a citizen of the United States, residing at Southampton, in the county of Bucks and State of Pennsylvania, have invented certain new and useful Improvements in Harrow or Cultivator Teeth, of which the following is a specification, reference being had therein to the accompanying drawings.

This invention relates to the teeth of harrows or cultivators which are formed in pairs or opposites, so that when in use in a harrow or cultivator frame and on opposite sides thereof, one tooth on one side of the frame will act upon the soil in an opposite direction to that on the other side, and at the same time the teeth will be interchangeable and reversible from one side to the other of the frame; and the invention consists in the special construction of the teeth, whereby the object of the invention is fully obtained, as will be fully described.

In the drawings, Figure 1 represents a section of a V-shaped harrow with a pair of oppositely-constructed teeth. Fig. 2 represents the same section and having the opposite teeth reversed in position to have what was the front edge the rear. Fig. 3 represents an upright side view of a tooth; and Fig. 4 represents a forward edge view in upright position and a transverse horizontal sectional view of a tooth on line *x x* of the tooth in edge view of Fig. 4.

A represents the harrow or cultivator tooth in its general form of construction, shown in perspective in Figs. 1 and 2 in reversed positions; and Fig. 3 shows one side, and Fig. 4 shows a front edge view, of the tooth as having a convex or elliptical form at shoulder B upon which the frame-work B' of the harrow or cultivator rests. Immediately below the shoulder the tooth begins to be thinner, diminishing in thickness to about the center of its length, when its thickness is kept till near the lower end, when it is curved off to, or nearly to, a sharp edge. The form seen in Fig. 4 in upright position shows a general concave or curve to one side on face A', while its opposite face, A'', is correspondingly convex in its curve from a point below the shoulder B to its lower edge.

*a* shows the toe of the tooth to be an acute angle at its lowest extreme point, curving slightly backward to the heel *a'*, when it makes a quicker curve upward to the side edge, giving the width of the tooth.

C is the shank of the tooth to secure the tooth to the frame of the harrow or cultivator, is rectangular in cross-section, and of such length as will pass through the frame B', receive a washer, have a screw-thread, *c*, cut on its upper end, and a nut, C', to screw thereon to secure it to frame B'. These teeth are made in pairs or rights and lefts, and can be changed from one side of the frame to the other as may be desired, or when it is desirable to change the toe *a* to be the advance point to harrow the ground or to have the heel *a'* to be the forward or entering edge, for when the heel *a'* is forward it tends to cut or scarify the sods or clods and smooth the ground, and when the toe *a* is in advance it tears into and partially moves the earth to the depth of its cut, making the loosened earth mellow and fine and in good condition to receive and germinate the seed sown therein.

The teeth may be made by casting them in iron or steel; or they may be formed in wrought metal by a drop and die, and after being so formed the screw-thread is cut upon the shank.

Having thus fully described my invention, what I claim, and desire to secure by Letters Patent, is—

A harrow or cultivator tooth, A, having its longitudinal central line curved to one side, one face, A', being longitudinally concave in its curve, and the opposite face, A'', correspondingly convex longitudinally, and both faces convex in transverse direction, and having the angular toe *a*, and curved heel *a'*, and shank C, as and for the purposes described.

In testimony whereof I affix my signature in presence of two witnesses.

FRANCIS F. WOLGAMUTH.

Witnesses:
ALEX RAMSEY,
EDWD. RAMSEY.